Jan. 13, 1953  G. M. SPILLER ET AL  2,625,217
WINDOW SCREEN
Filed July 26, 1951
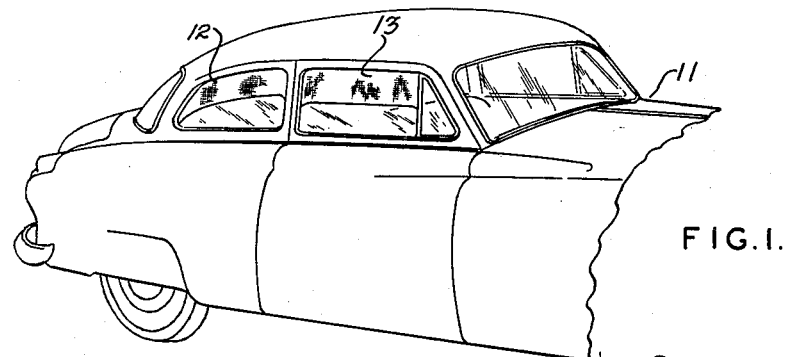
FIG. I.
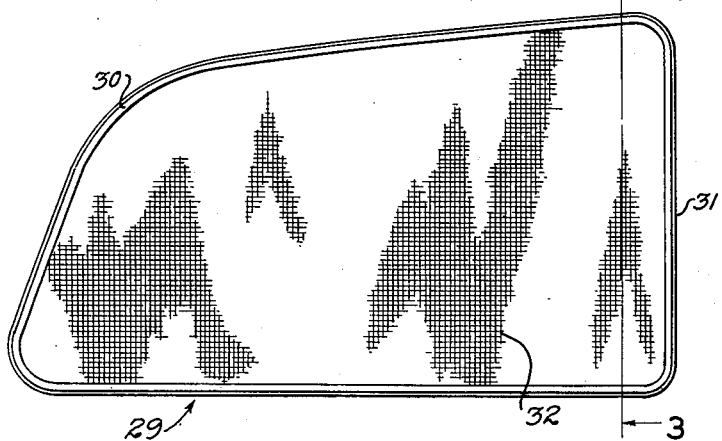
FIG. 2.
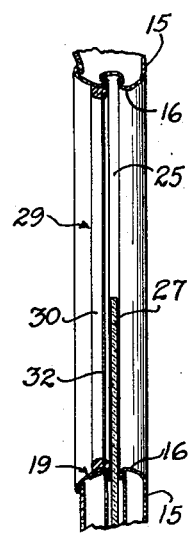
FIG. 3.
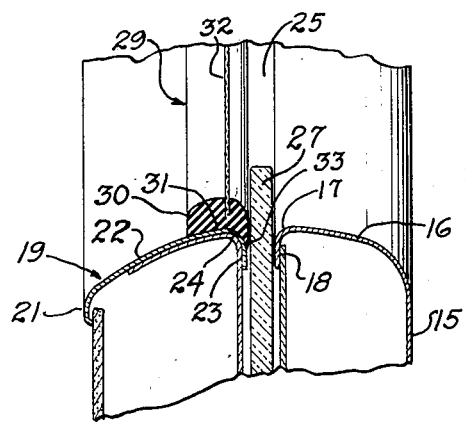
FIG. 4.
INVENTORS
GLADYS M. SPILLER
EUGENE W. SPILLER
BY
Francis T. Burgess
ATTORNEY Patented Jan. 13, 1953

2,625,217

UNITED STATES PATENT OFFICE 2,625,217

WINDOW SCREEN

Gladys M. Spiller and Eugene W. Spiller, St. Louis, Mo.

Application July 26, 1951, Serial No. 238,708

2 Claims. (Cl. 160—90)

This invention relates to window screens, particularly to screens for the windows of automotive vehicles.

Although modern passenger automobiles incorporate numerous facilities for the comfort of riders, criticism is frequently directed at the absence of means for preventing the ingress of insects. Insects are, of course, most numerous during warm weather, when comfort dictates that automobile windows be kept open. Not infrequently, serious accidents are caused when the driver of an automobile is stung by a bee or other insect freely admitted through the open windows. Moreover, if the automobile is used as sleeping quarters on camping trips or on tours, as is frequently the case, restful sleep is prevented by the presence of mosquitos, gnats, or other insects freely admitted to the interior of the automobile through the open windows.

Therefore an object of this invention is to provide means for excluding insects from the interior of closed automotive vehicles.

A further object is to provide a readily inserted, easily removable, inexpensive screen for the windows of conventional automobiles.

In nearly all modern automobiles, the window openings are framed by molding of substantially channel cross-section. The channel molding generally consists of an arcuate web portion connected to flange portions by rounded corner portions. A similar framing is used on both sides of the slidably mounted window glass, except that the external window framing usually is merely a part of the exterior sheathing. There is no place, nor is there any means whereby conventional screen framing could be sealingly secured to either the inner or outer window frame portions. Accordingly, we achieve the above objects by providing a screen frame of plastic material of relatively high elasticity, with an external contour conforming substantially to the curved edge of the automobile window frame adjacent the glass. Wire mesh is molded into this frame to form a screen, which, due to its elastic properties, may be easily pushed into place in the window frame. When correctly positioned, the screen frame returns to its normal shape, grippingly engaging the curved edge of the window frame adjacent the glass. The screen is thus sealingly secured in the frame adjacent the glass, but does not interfere with the movement thereof.

Referring to the drawing,

Fig. 1 is a fragmentary view of an automobile body showing the position of screens.

Fig. 2 is an elevation of a screen made according to this invention.

Fig. 3 is a transverse section through a window and screen along the line 3—3 of Fig. 2.

Fig. 4 is an enlarged view of a portion of Fig. 3.

Referring to the drawing, the numeral 11 generally indicates the body portion of a closed automobile having conventional irregularly shaped window openings as at 12 and 13.

A transverse vertical sectional view of a typical automobile window opening is illustrated in Fig. 3, in which the numeral 15 refers to the sheet metal exterior sheathing of an automobile rounded to form a curved, channel-shaped window molding 16. Molding 16 is in the form of a compound curve, rising steadily for some distance from its point of tangency with the outer skin of the automobile and then curving abruptly downwardly at 17 to form an inner flange portion 18.

The interior window molding 19 is similarly of curved channel shape, but instead of merely being a continuation of the sheathing, is a separate unit consisting of an inner curved flange portion 21, a curved web portion 22, and an outer flange portion 23 joined to the web portion by a rounded edge 24. Molding 19 is secured to the automobile wall structure so that its outer flange is in fixed spaced relation with the inner flange of outer molding 16, the intervening space 25 being provided to accommodate vertically slidable window glass 27.

The numeral 29 generally indicates a window screen including a frame portion 30, which may be molded from a commercially obtainable plastic material of relatively high elasticity, such as "Vinylite," a thermoplastic synthetic vinyl resin. Vinylite is well suited to this type of usage, since the elastometric type has the required elasticity, may be molded or extruded into any desired shape, and may be obtained in any color desired. Thus, a frame portion made of this, or similar, material, though deformed for insertion into an automobile window frame, will regain its original form as soon as the stresses incident to insertion are removed.

Frame portion 30 may be molded to conform in outline with the shape of any automobile window opening, such as 12 or 13 and the periphery 31 of frame portion 30 may be shaped to conform substantially to that portion of the window molding 19 which includes rounded edge 24. Thus, the periphery has a continuous round bottomed groove adapted to grippingly engage the opposite sides of curved edge 24 of the window molding when the frame is pushed into the position shown in Fig. 3 and more clearly in Fig. 4.

Ordinary wire mesh screening 32 is molded into frame portion 30. However, it is evident that frames of this type are adaptable for use as storm windows for automobiles, by substituting transparent material for the screening.

To insert the screen, it is merely pushed into the window opening. Since the outside peripheral edge of the frame, indicated at 33, circumscribes a larger area than the minimum window opening, the plastic material of the frame permits sufficient deformation to allow peripheral edge 33 to pass over rounded edge 24 of molding 19. When the screen reaches the position shown in Figs. 3 and 4, the inherent resilience of the frame causes the frame to expand to its original shape and size, so that it is securely locked in place by gripping engagement with opposite sides of rounded edge 24 of molding 19.

The invention may be modified as will occur to those skilled in the art, and exclusive use is contemplated of all modifications as come within the scope of the appended claims.

In order to avoid interference with normal movement of the window glass, the outer edge 33 of the frame extends substantially vertically upward from the outer edge of groove 31, so that when the frame is positioned in the window, edge 33 lies in substantially the same vertical plane as the vertical edge of the window molding adjacent the glass. Shifting of the edge 33 of the frame into the line of movement of the glass is prevented by the engagment of the inner sloping portion of groove 31 with the sloping surface of molding 22.

We claim:
1. In a vehicle window having a pair of spaced parallel moldings of curved cross section and a pane slidably mounted between said moldings, the combination therewith of a frame of elastic material, said frame conforming to the outline of one of said moldings and having a grooved peripheral surface complementary to the surface of said one molding, the edge of said frame adjacent said pane lying in substantially the same vertical plane as the edge of said molding whereby to permit free movement of said pane.

2. In a vehicle window having a pair of spaced parallel moldings curved cross section and a pane slidably mounted between said moldings, the combination therewith of a frame of elastic material, said frame conforming to the outline of one of said moldings and having a grooved peripheral surface complementary to the surface of said one molding, said peripheral surface including means for retaining the edge of said frame adjacent said pane in substantially the same vertical plane as the edge of said molding whereby to permit free sliding of said pane.

GLADYS M. SPILLER.
EUGENE W. SPILLER.

REFERENCES CITED

The following references are of record in the file of this patent:

UNITED STATES PATENTS

| Number | Name | Date |
|---|---|---|
| 2,255,725 | Trescher | Sept. 9, 1941 |
| 2,297,729 | Thomas | Oct. 6, 1942 |
| 2,532,886 | Bianchi | Dec. 5, 1950 |
| 2,548,560 | Schembra | Apr. 10, 1951 |